Oct. 14, 1947.                     J. L. UNDERHILL                     2,429,111
            MEANS FOR PREVENTING ARCUATE IMAGE MOTION
                  IN AN OPTICAL SOUND RECORDING SYSTEM
                           Filed Aug. 31, 1942
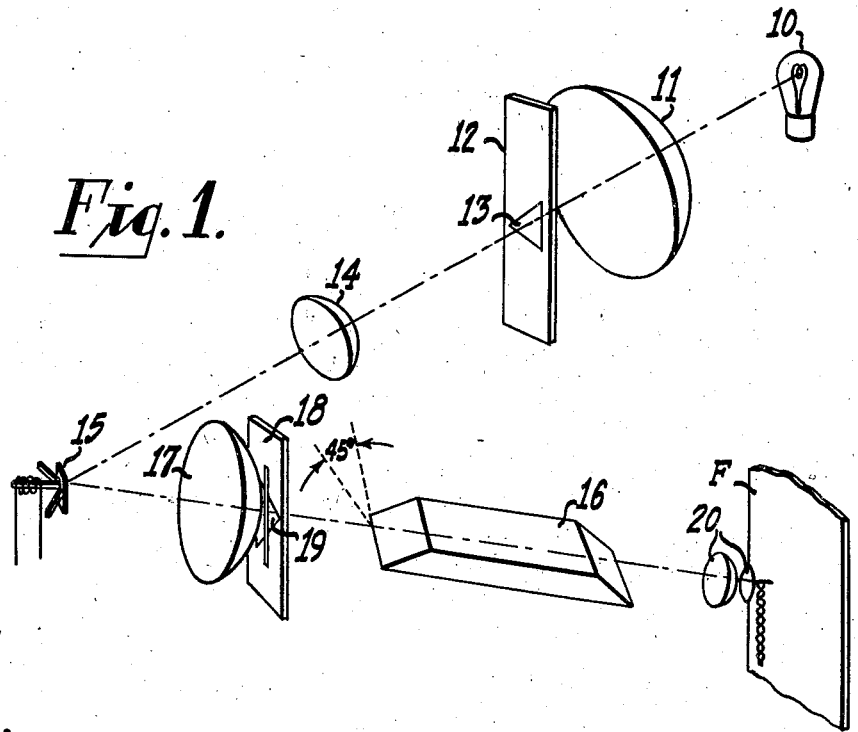
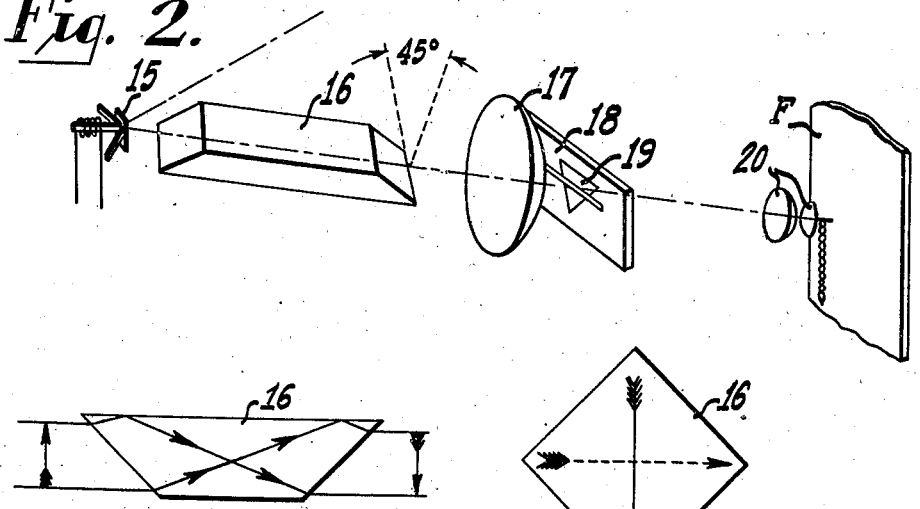
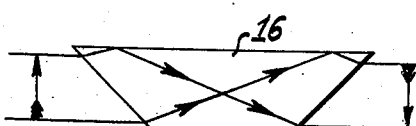
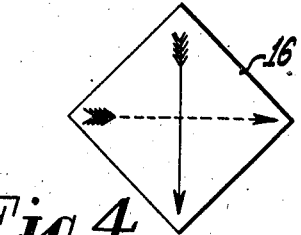
Fig. 3.    Fig. 4.
Inventor
JOSEPH L. UNDERHILL
By
C. D. Tuska
Attorney Patented Oct. 14, 1947

2,429,111

UNITED STATES PATENT OFFICE 2,429,111

MEANS FOR PREVENTING ARCUATE IMAGE MOTION IN AN OPTICAL SOUND RECORDING SYSTEM

Joseph L. Underhill, Indianapolis, Ind., assignor to Radio Corporation of America, a corporation of Delaware Application August 31, 1942, Serial No. 456,752

18 Claims. (Cl. 179—100.3)

This invention relates to a sound recording optical system and more particularly to an optical system for recording sound on film by the use of a galvanometer.

Sound records are made on film in a number of different ways as, for example, by a glow lamp, by a moving light valve, a Kerr cell type of light valve, and by a galvanometer. The galvanometer type of recording optical system is more versatile than the others in that it can be used for making variable area records of many different types or for making variable density records simply by interchanging the light aperture in the optical system.

In some types of commercial optical systems, the optical axes to and from the galvanometer lie in the same horizontal plane and the galvanometer mirror vibrates at about an axis lying substantially in that plane. In such apparatus, an isosceles triangular mask or aperture is interposed between the lamp and the galvanometer, the base of the triangle being horizontal. The slit is horizontal. In this arrangement the two axes of the optical system may intersect at the galvanometer mirror at an angle of from 45 degrees to 60 degrees. This arrangement has the disadvantage that the movement of the image of the aperture over the slit by the galvanometer mirror causes an arcuate movement rather than rectilinear movement thereof, which tends to produce distortion in the recorded sound. The causes of this arcuate motion and one method of at least partially compensating therefor are described in detail in Sachtleben Patent 2,158,307, issued May 16, 1939. In the present apparatus the arcuate motion of the image is prevented instead of being compensated for. This is accomplished by making the base of the triangular aperture vertical instead of horizontal, mounting the galvanometer with its axis vertical, and by making the slit vertical, and then rotating the image of the slit optically through an angle of 90 degrees between the slit and the objective lens. Alternatively the slit can remain in a horizontal position and the image of the aperture can be rotated optically through an angle of 90 degrees between the galvanometer and the slit.

The invention can be applied to any of the usual types of recording accomplished by means of a galvanometer, whether variable area or variable density.

One object of the invention is to provide an improved sound recording optical system.

Another object of the invention is to provide a sound recording optical system which will avoid certain distortions inherent in prior analogous systems.

Another object of the invention is to provide a sound recording optical system having means for rotating the image and its direction of movement between slit and objective lens or between the galvanometer and the slit.

Other and incidental objects of the invention will be apparent to those skilled in the art from a reading of the following specification and an inspection of the accompanying drawings in which Figure 1 is a diagrammatic perspective view of one form of my improved optical system, Figure 2 is a diagrammatic perspective view of a modified form of my invention, Figure 3 is an elevational of the prism used therein, and Figure 4 is a diagram illustrating the manner in which the image is rotated by the prism.

Referring first to Fig. 1, light from the exciter lamp 10 is directed by the lens 11 through the aperture 13 in the aperture plate 12 in the usual manner and the light emerging from the aperture 13 passes through the lens 14 to the galvanometer mirror 15.

The focal lengths of the lenses are preferably so chosen that the lenses 11 and 14 together form an image of the light source 10 in the mirror 15. The aperture in the plate 12 is placed at an angle of 90 degrees relative to its usual position. For example, if the plane defined by the optical axes 10—15 and 15—20 is horizontal and the film F moves perpendicularly to that plane the axis of the aperture 13 in prior art systems would be vertical, and in my present system it would be horizontal.

The galvanometer mirror 15 is mounted to rotate about an axis perpendicular to the plane defined by the two optical axes. Due to this arrangement of the galvanometer, the image of the aperture 13 will move in the plane defined by the axes without the arcuate motion as described in the Sachtleben patent referred to above.

The slit in the plate 18 is placed at an angle of 90 degrees to the plane defined by the two optical axes rather than in its usual position parallel to and coincident with that plane. Light passing through the slit in plate 18 passes through the prism 16 which will be described in greater detail hereinafter and an image of the slit is formed on film F by means of the objective lens 20.

The prism 16 is what is known commercially as a Dove prism. This prism not only serves to invert the image as shown in Fig. 3 but if an object is viewed or an image is produced through the prism and the prism is then rotated, the object or image will appear to rotate at twice the angular speed of the prism. As shown in Fig. 1, the prism 16 is located with its base at an angle of 45 degrees to the plane defined by the two optical axes and the slit in the plate 18. Since the image of the slit is rotated 90 degrees due to the 45 degree position of the prism 16, it will appear horizontal on the film.

In the modification of the invention shown in Fig. 2, the prism 16 is placed between the galvanometer 15 and the slit plate 18 and again in the 45 degree position. In this arrangement, the image of the aperture 13 on the plate 18 which is produced by the lenses 14 and 17, acting in conjunction, is rotated 90 degrees by the prism and the plate 18 is used in its usual horizontal position. As the light beam is moved back and forth in the plane defined by the two optical axes by the mirror 15, the motion of the light beam will be rotated 90 degrees by the prism 16 and will appear on the slit plate 18 as a vertical movement of the image 19. As shown in Fig. 4, the 45 degree position of the prism 16 causes the image to be rotated 90 degrees. In Fig. 1, this rotates the image of the vertical slit to a horizontal position on the film while in the form of the apparatus shown in Fig. 2, the image of the triangular aperture is rotated from the horizontal to the vertical position and the movement of the image over the slit is shifted correspondingly.

As pointed out above, there will be no rotary movement of the image 19 due to the fact that the axis of rotation of the mirror 15 in both Figs. 1 and 2 is perpendicular to the plane of the optical axes. At the same time in both arrangements the image is caused to move perpendicular to the plane defined by the optical axes, thereby permitting an arrangement which is extremely compact, efficient and free from distortion.

It will be apparent that the invention is not limited to the use of a triangular aperture or mask for the production of a symmetrical variable area record as illustrated, but that any of the apertures usual in variable area recording may be used in producing the corresponding types of variable area records. If ground noise reduction shutters are used adjacent the aperture plate 12 or slit plate 18 they should, of course, be maintained in the proper position relative to the said aperture or slit plate. If the zero shift type of ground noise reduction is used, the ground noise reduction system requires no modification.

I claim as my invention:

1. A sound recording optical system including a light source, means for directing a beam of light from said source, means for vibrating said beam in accordance with sound waves to be recorded, means for directing said beam onto a photographic surface, and optical means between said vibrating means and said photographic surface for rotating the direction of vibration of said beam with respect to said photographic surface, said rotated direction of vibration being at an angle to said original direction of vibration.

2. A sound recording optical system including means for directing a beam of light through an aperture plate to a galvanometer mirror, means for directing light reflected by the galvanometer mirror onto a slit plate and forming an image of said aperture thereon, means for vibrating said mirror to move said beam of light in a certain direction, means for focusing light passing through the slit in said plate onto a sound record film and means between the galvanometer mirror and said film for rotating the beam of light to provide a direction of movement to said image at an angle to that given to said beam of light by said mirror.

3. A sound recording optical system including means for directing a beam of light through an aperture plate to a galvanometer mirror, means for directing light reflected by the galvanometer mirror onto a slit plate and forming an image of said aperture thereon, means for vibrating said mirror to move said beam of light in a certain direction, means for focusing light passing through the slit in said plate onto a sound record film and means between the galvanometer mirror and the slit plate for rotating the beam of light to provide a direction of movement to said image at an angle to that given to said beam of light by said mirror, said angle being less than 180 degrees.

4. A sound recording optical system including means for directing a beam of light through an aperture plate to a galvanometer mirror, means for directing light reflected by the galvanometer mirror onto a slit plate and forming an image of said aperture thereon, means for vibrating said mirror to move said beam of light in a certain direction, means for focusing light passing through the slit in said plate onto a sound record film and a reflecting prism between the galvanometer mirror and the film for rotating the beam of light to provide a different angular direction of movement within 180 degrees to said image than that given to said beam of light by said mirror.

5. A sound recording optical system including means for directing a beam of light through an aperture plate to a galvanometer mirror, means for directing light reflected by the galvanometer mirror onto a slit plate and forming an image of said aperture thereon, means for focusing light passing through the slit in said plate onto a sound record film and a reflecting prism between the galvanometer mirror and the slit plate for rotating the beam of light in any predetermined amount.

6. A sound recording optical system including means for directing a beam of light through an aperture plate to a galvanometer mirror, means for directing light reflected by the galvanometer mirror onto a slit plate and forming an image of said aperture thereon, means for focusing light passing through the slit in said plate onto a sound record film and reflecting prism between the slit plate and a film for rotating the beam of light in any predetermined amount.

7. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror about an axis perpendicular to the plane defined by said optical axes and means between the galvanometer mirror and the film for rotating the beam of light in any predetermined amount less than 180 degrees.

8. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror about an axis perpendicular to the plane defined by said optical axes and means between the galvanometer mirror and the slit plate for rotating said beam of light.

9. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror about an axis perpendicular to the plane defined by said optical axes and means between the slit plate and film for rotating said beam of light in any predetermined amount less than 180 degrees.

10. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror in accordance with said waves about an axis perpendicular to the plane defined by said optical axes and a reflecting prism between the galvanometer mirror and the film for rotating said beam of light.

11. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror in accordance with said waves about an axis perpendicular to the plane defined by said optical axes and a reflecting prism between the galvanometer mirror and the slit plate for rotating the beam of light.

12. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror in accordance with said waves about an axis perpendicular to the plane defined by said optical axes and a reflecting prism between the galvanometer mirror and the film for rotating said beam of light.

13. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror about an axis perpendicular to the plane defined by said optical axes and means between the galvanometer mirror and the film for rotating said beam of light through an angle of 90 degrees.

14. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror about an axis perpendicular to the plane defined by said optical axes and means between the galvanometer mirror and the slit plate for rotating said beam of light through an angle of 90 degrees.

15. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror about an axis perpendicular to the plane defined by said optical axes and means between the slit plate and the film for rotating said beam of light through an angle of 90 degrees.

16. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film, means for vibrating said galvanometer mirror about an axis perpendicular to the plane defined by said optical axes and a reflecting prism between the slit plate and the film for rotating said beam of light through an angle of 90 degrees.

17. A sound recording optical system including means for directing a beam of light along one optical axis through an aperture in an aperture plate onto a galvanometer mirror, means for directing light reflected by said galvanometer mirror along a second optical axis through a slit in a slit plate to a light sensitive film adapted to move along a path perpendicular to the plane defined by said optical axes, means for vibrating said galvanometer mirror about an axis perpendicular to the said plane and a reflecting prism between the galvanometer mirror and the slit plate for rotating said beam of light through an angle of 90 degrees.

18. In a sound film device, a light source, a slit plate, means for imaging said slit onto a film, and means between said slit and said film for fixedly rotating the light forming an image of said slit through an angle of 90 degrees.

JOSEPH L. UNDERHILL.

REFERENCES CITED

The following references are of record in the file of this patent:

UNITED STATES PATENTS

| Number | Name | Date |
|---|---|---|
| 1,631,866 | Heurung | June 7, 1927 |
| 2,031,835 | Kellogg | Feb. 25, 1936 |
| 1,804,289 | Taylor | May 5, 1931 |
| 1,935,070 | Walther | Nov. 15, 1933 |
| 1,917,653 | Kroesen | July 11, 1933 |
| 2,179,098 | Mason | Nov. 7, 1939 |